United States Patent

Barkan

[11] Patent Number: 6,000,560
[45] Date of Patent: Dec. 14, 1999

[54] SUPPORT TRAY TILT MECHANISM

[76] Inventor: Lior Barkan, 39A Kehilat Sophia, Tel Aviv 69018, Israel

[21] Appl. No.: 09/240,672

[22] Filed: Feb. 2, 1999

[30] Foreign Application Priority Data

Feb. 11, 1998 [IL] Israel .......................................... 123261

[51] Int. Cl.⁶ ........................................................ A47F 5/00
[52] U.S. Cl. ...................... 211/96; 211/133.6; 248/282.1; 248/921; 248/923
[58] Field of Search ............................ 211/96, 97, 133.6, 211/88.01; 248/282.1, 920, 921, 922, 923, 346.05

[56] References Cited

U.S. PATENT DOCUMENTS

| | | | |
|---|---|---|---|
| 4,068,961 | 1/1978 | Ebner et al. | 248/921 X |
| 4,516,751 | 5/1985 | Westbrook | 248/921 X |
| 4,844,388 | 7/1989 | Kuba et al. | 248/282.1 X |
| 5,429,336 | 7/1995 | Ko | 248/282.1 X |
| 5,553,820 | 9/1996 | Karten et al. | 248/921 X |
| 5,842,672 | 12/1998 | Sweere et al. | 248/921 X |
| 5,881,985 | 3/1999 | Hoenig | 248/923 X |

FOREIGN PATENT DOCUMENTS

| | | |
|---|---|---|
| 2635662 | 3/1990 | France . |
| 2218149 | 11/1989 | United Kingdom . |
| 2271273 | 4/1994 | United Kingdom . |

Primary Examiner—Robert W. Gibson, Jr.
Attorney, Agent, or Firm—Browdy and Neimark

[57] ABSTRACT

A support tray assembly comprising a planar tray formed with a spherical portion being formed with a central slit-like opening extending along a line of pitch of the tray and a cam-engaging track extending along a tilt axis of the tray. A manipulating member is formed with a seat portion forming part of a sphere corresponding in shape with the spherical portion of the support tray and being in sliding engagement therewith. The manipulating member is rotatable about an axis of rotation and is fitted with a cam member rotatably fixed thereto. The cam member is eccentric with respect to the axis of rotation and is adapted for reciprocal sliding engagement with the cam-engaging track of the tray along the tilt axis. Rotation of the manipulating member imparts the tray with reciprocal displacement only along the line of pitch.

11 Claims, 5 Drawing Sheets

SUPPORT TRAY TILT MECHANISM

FIELD OF THE INVENTION

The present invention is generally in the field of support trays or shelves adapted for supporting a television set or the like, and more specifically, the invention is directed to a mechanism for adjusting the tilt of such a support tray.

BACKGROUND OF THE INVENTION

Support trays for which the invention is concerned has long been known. Such support trays typically comprise a substantially planar base portion and a support arm coupled on the one hand to the base portion and on the other hand to the support wall. It is highly desired to allow several degrees of freedom for adjusting the tray member so that the television set or the like which is mounted on the tray member can be adjusted to assume a convenient viewing position. Typically, at least two degrees of freedom are required namely, tilting along a line of pitch (about an essentially horizontal axis) and rotation, about an essentially vertical axis.

Some mechanisms have been provided for allowing the adjustment of the tilting position of the tray. Among those is Israel Patent No. 100263. However, the mechanism in accordance with that patent is complex both in assembly and in operation , and even more so, is not pleasing to the eye.

Other known means are, for example, a tray assembly fitted with a so-called ball and socket mechanism, wherein tilting the tray is carried out by releasing a fixation bolt, re-positioning the tray at a desired position and securing the bolt. A first drawback of this mechanism is that it does not enable fine tuning of the tray's position. Another drawback is that releasing the fixation bolt without holding the tray supporting a television set or the like, may result in sudden displacement of the tray whereby the television may fall from the tray.

It is an object of the present invention to provide an improved support tray assembly wherein the mode of coupling the tray to the support arm and the adjustment of the tray substantially reduces or overcomes the disadvantages of prior art such devices.

BRIEF SUMMARY OF THE INVENTION

According to the present invention there is provided a support tray assembly articulated to a supporting wall via a support arm, the support tray assembly comprising:

- a substantially planar tray formed with a spherical portion, said spherical portion being formed with a central slit-like opening extending along a line of pitch of said tray; said tray being further formed with a cam-engaging track extending along a tilt axis;
- a manipulating member formed with a seat portion forming part of a sphere corresponding in shape with the spherical portion of the support tray and being in sliding engagement therewith; the manipulating member is rotatable about an axis of rotation and is fitted with a cam member rotatably fixed thereto; said cam member is eccentric with respect to the axis of rotation and is adapted for reciprocal sliding engagement with the cam-engaging track of the tray, along said tilt axis;
- the support arm is hinged at one end thereof to the supporting wall and at an opposed end thereof rotatably supports the manipulating member.

The arrangement is such that rotation of the manipulating member, while the tray is kept fixed, imparts the tray with reciprocal displacement only along the line of pitch.

In accordance with the invention, the spherical seat portion of the manipulating member and the matching spherical portion of the tray, are slidingly articulated to one another by a shaft slidingly received within the slit-like opening of the support tray and extends through a bore within the manipulating member, along the axis of rotation.

An arrangement comprising two spherical components are slidingly linked to one another, is at times referred to as a "ball and socket" connection.

Typically, the tilt axis extends substantially transverse with respect to the slit-like opening and extends along the line of pitch. By a preferred embodiment of the invention, the tilt axis is offset with respect to an apex of the spherical portion. This results in tilting of the tray in one direction only. Alternatively, the tilt axis may extend at the apex of the spherical portion, in which case the tray may be tilted in either direction along the line of pitch.

Preferably and typically, the axis of rotation is vertical and the support tray together with the manipulating member are secured to the support arm by a shaft fastened to the support arm, said shaft extending along the axis of rotation.

In accordance with a specific application of the invention, the tray is capable of being tilted along the line of pitch, between a first position in which it is essentially horizontal and where the cam member is centrally positioned with respect to the cam-engaging track, and a second position in which the tray is inclined to its maximal extent, where said cam member is rotated by 180° C. with respect to the first position.

By another embodiment, the tray is tiltable along the line of pitch, between a first position in which it is essentially horizontal and where the shaft is situated at one end of the slit-like opening of the tray, and a second position in which the tray is inclined to its maximal extent, where the shaft is situated at an opposed end of the slit-like opening.

In order to ensure that the tray assumes its tilt also during rotation thereof, rotating the tray entails rotation of the manipulating member.

In accordance with a specific application of the invention, the tray is tiltable between about 0° and 20°, with a range of 0° to 12° being preferred.

BRIEF DESCRIPTION OF THE DRAWINGS

For better understanding, the invention will now be described, in a non-limiting manner, with reference to the accompanying drawings, in which.

DETAILED DESCRIPTION OF A SPECIFIC EMBODIMENT

Figure 1:
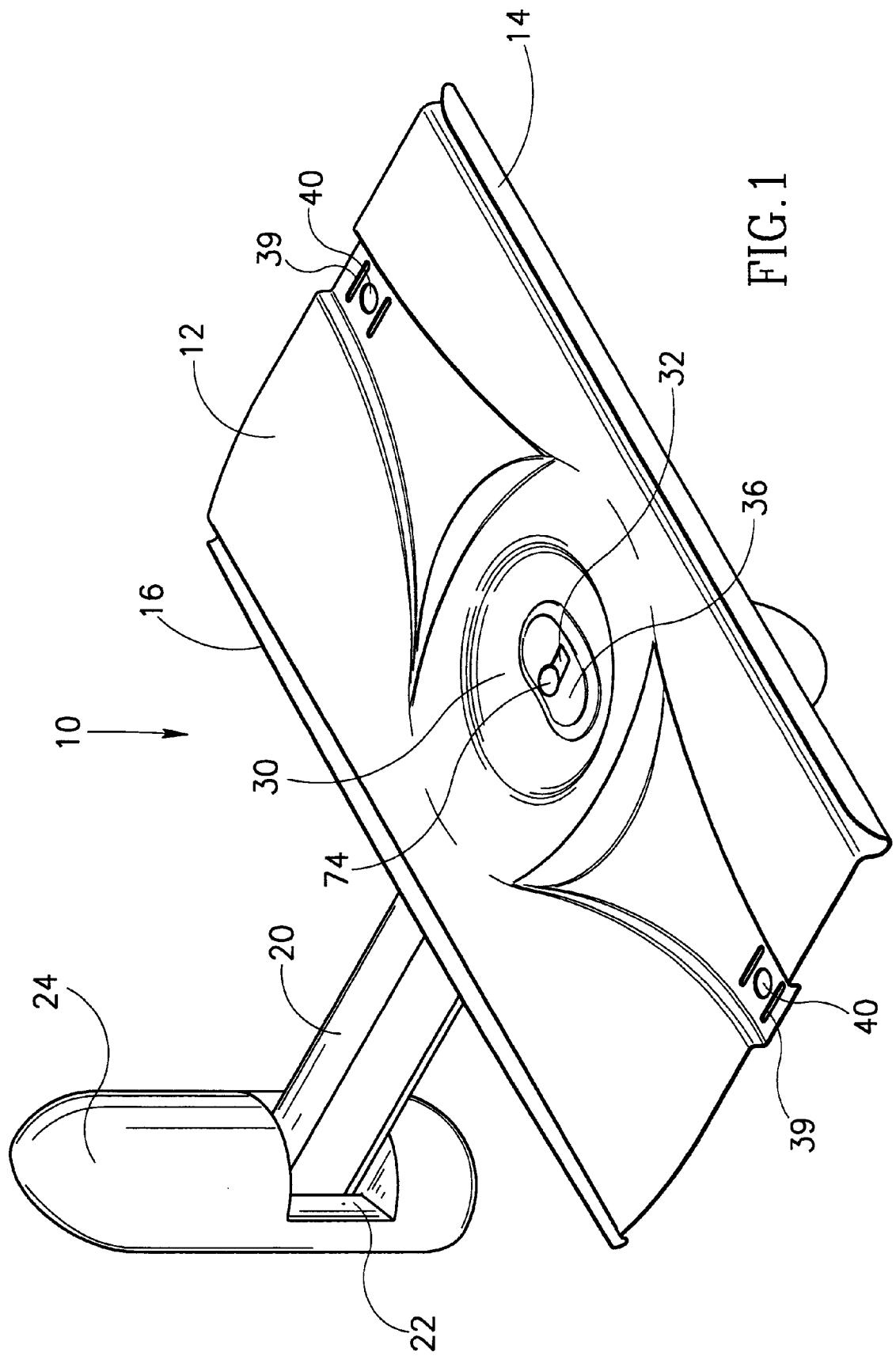
FIG. 1 is an isometric view of a support tray assembly in accordance with the present invention.
Figure 2:
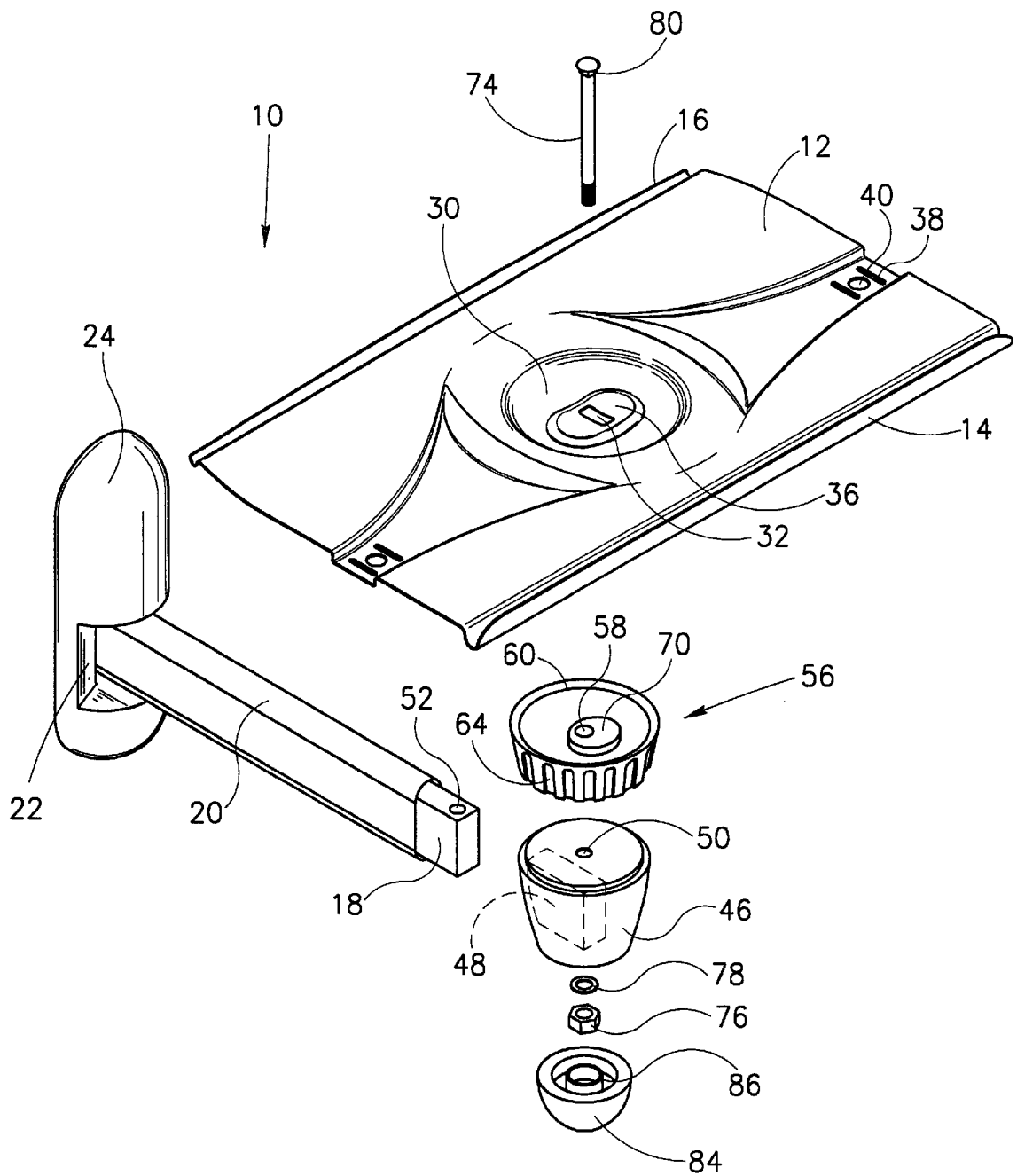
FIG. 2 is an exploded, isometric view of the support tray assembly seen in FIG. 1.

Attention is first directed to FIGS. 1 and 2 of the drawings illustrating a support tray assembly generally designated 10 and comprising a substantially rectangular, planar tray 12 formed with bent transverse front and rear edges 14 and 16, respectively, for imparting the tray rigidity. An elongated support arm 18 is received within a decorative covering sleeve 20, where one end of the support arm 18 is pivotally coupled in the conventional manner to a wall bracket (not seen), the latter being concealed by a decorative cover 24.

Tray 12 is stamped-out, at or adjacent its center, with a spherical portion 30 formed with a central slit-like opening 32 being substantially perpendicular to the transverse edges 14 and 16, constituting a line of pitch of the tray, as will hereinafter become apparent.

The tray 12 is further formed at its stamped out portion 30 with a cam-engaging track 36 generally having an oval shape, extending transversely with respect to the slit-like opening 32 and being offset with respect to the apex of the spherical portion 30. The cam-engaging track 36 symmetrically extends along a tilt axis of the tray, designated in the top views of FIGS. 3–5 as 37, which as will become apparent hereinafter is offset with respect to the center line 38 of the spherical portion 30. It will be appreciated that the slit-like opening 32 extends within the cam-engaging track 36. The cam-engaging track 36 is stamped-in, i.e. upwardly from the spherical portion 30, as can best be seen in FIGS. 3B, 4B and 5B.

In addition, the tray 12 is formed adjacent its side edges with openings 39 for insertion of a strap (not shown) for securing thereto a television set or the like. Another opening 40 is provided for attaching support arms (not shown) for embracing a television set, also as known in the art.

As can best be seen in FIG. 2, a seating member 46 is fitted with a receptacle 48 (seen in dashed lines in FIG. 2 and also seen in cross-sectional view of FIGS. 3–5) mounted over the free end of the support arm 18. Seating member 46 is formed with a central bore 50 which once mounted over support arm 18 is coaxial with bore 52 of the support arm 18.

A manipulating member generally designated 56 is rotatably mounted over the seating member 46 and has a bore 58 coaxially extending with bore 50 of seating member 46. A peripheral upper surface 60 of the manipulating member 56 constitutes a portion of a sphere, corresponding with the spherical portion 30, as can best be viewed in the sectional views of FIGS. 3–5, whereby the spherical portion 30 is slidable over the manipulating member 56, as will be explained in detail hereinafter. This arrangement is known in the art as a ball and socket connection. The peripheral face 64 of the manipulating member 56 is recessed so as to facilitate its gripping by a user as will become apparent hereinafter.

Figure 4A:
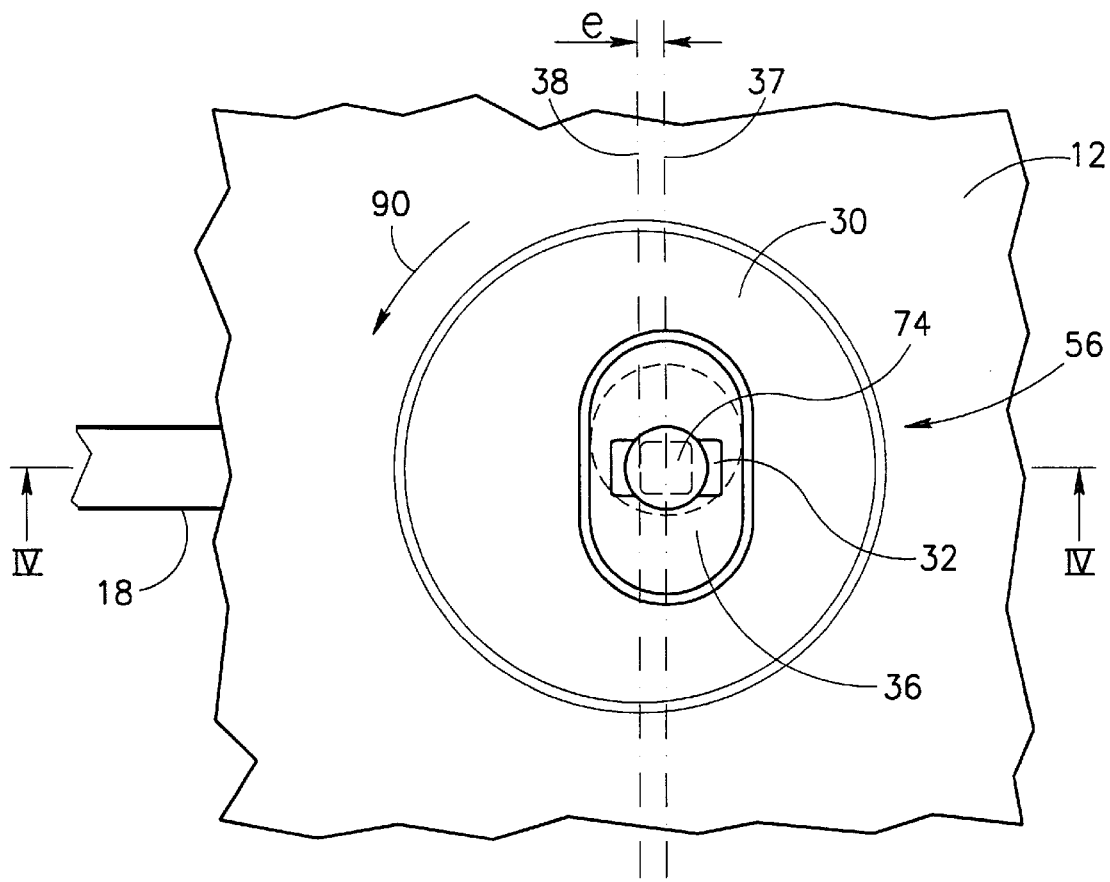
FIGS. 4A and 4B are the same views as FIGS. 3A and 3B, respectively, illustrating the support tray assembly in an intermediate state of inclination.
Figure 4B:
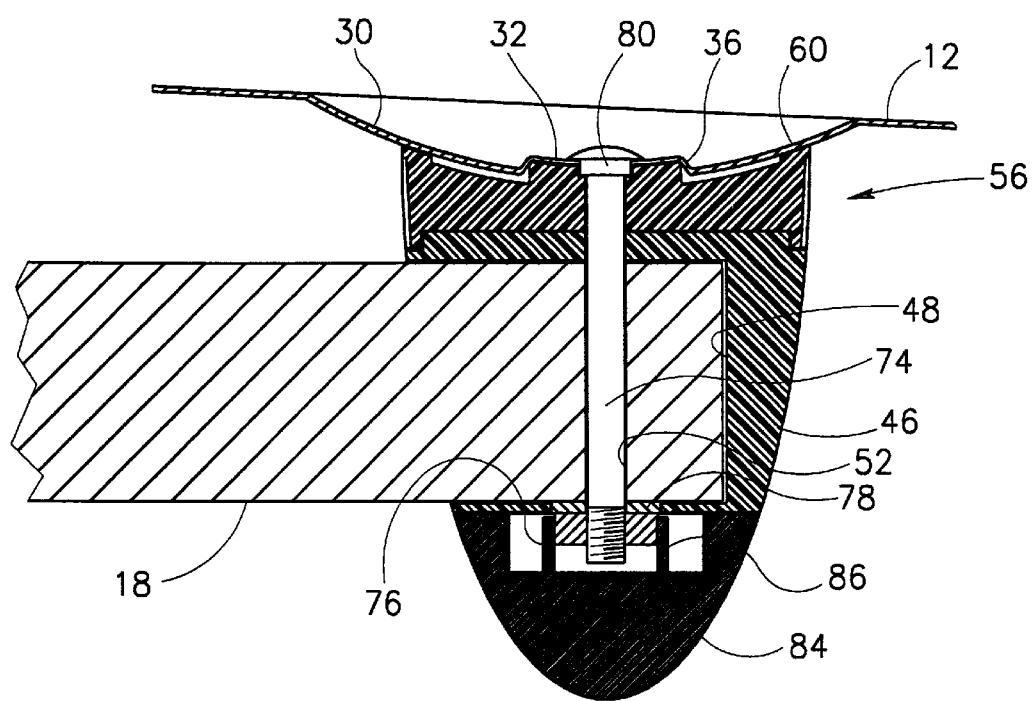
Figure 5A:
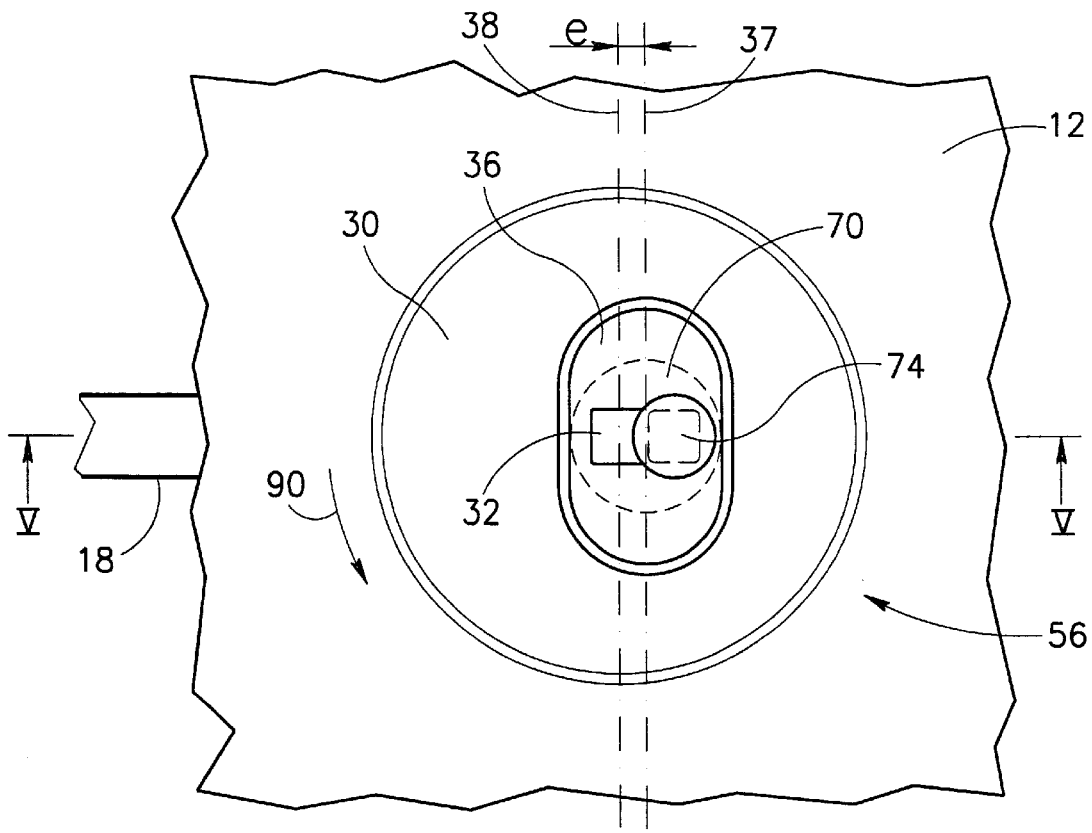
FIGS. 5A and 5B are the same as FIGS. 3A and 3B, respectively, in a maximal inclined position.

Further seen in FIG. 2, the manipulating member 56 is provided on its upper face with a cam member 70 which in fact, and as can best be seen in the top views of FIGS. 3–5 has a circular cross-section and which is eccentric with respect to the bore 58 of the manipulating member 56 at e. As can further be seen in the top views of FIGS. 3 to 5, the diameter of the cam member 70 is slightly smaller than the width of the cam-engaging track 36 and is adapted for sliding within the cam-engaging track 36. The arrangement is such that the center of the cam member 70 is offset with respect to the centerline 38 of the spherical portion 30 at e.

A shaft 74 extends through slit 32, then through bore 58 of the manipulating member 56 and through bore 50 of seating member 46 and into bore 52 of the support arm 18 and is secured at its bottom end by bolt 76 and a retaining ring 78 (as seen in FIG. 2). The upper portion of shaft 74 has a square portion 80 adapted for sliding engagement within slit-like opening 32, thus preventing the shaft 74 from rotation while assembly and tightening of bolt 76, as known per se. Shaft 74 in fact extends through the vertical axis of rotation of the tray 12.

A decorative cover 84 is attached to the seating member 46 by circumferential wall 86 embracing bolt 76 in a press fit, as known per se, or by any other means.

Figure 3A:
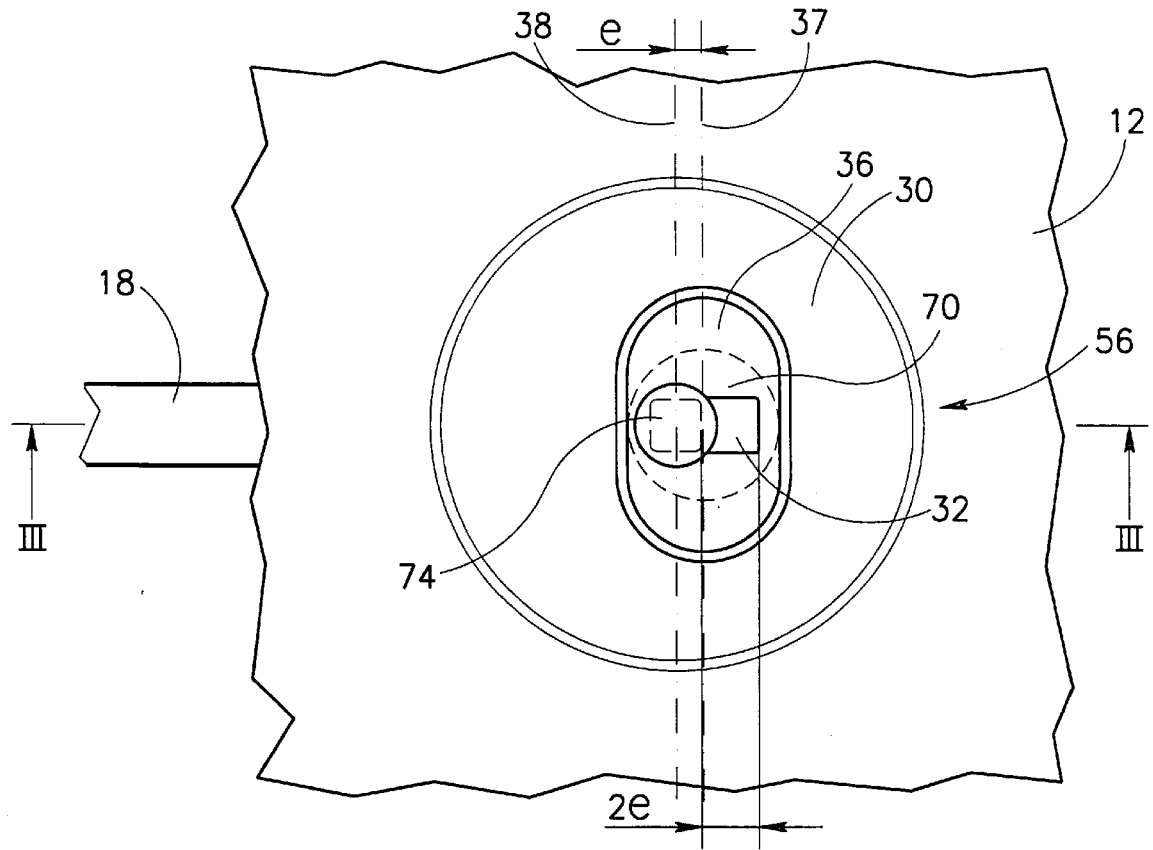
FIGS. 3A and 3B are a top, partial view and a cross-sectional view along line III—III in FIG. 3A, respectively, illustrating the support tray assembly in a first, essentially horizontal position.
Figure 3B:
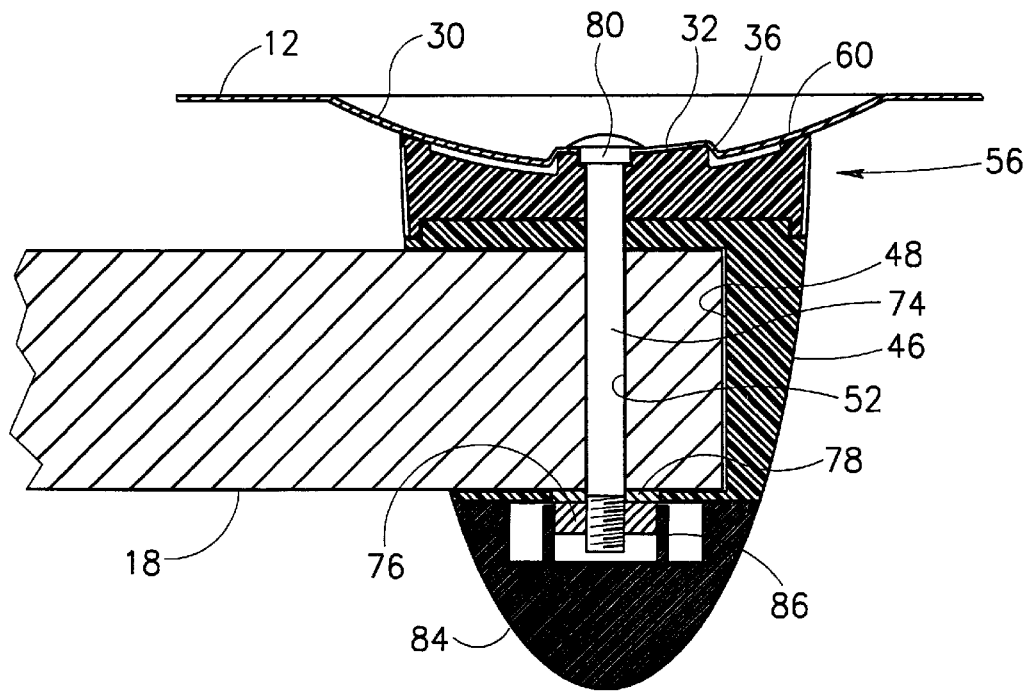

Further attention is now directed to FIGS. 3–5, with reference to which operation of the support tray assembly will be illustrated As can be seen in FIG. 3, and in particular in FIG. 3A, the cam-member 70 is centrally positioned within the cam-engaging track 36 whereby tray 12 is retained at an essentially horizontal position, as seen in FIG. 3B. In this position shaft 74 is located at a rearmost end of the slit-like opening 32 (see FIG. 3A), with the distance between the front-most end of the slit-like opening 32 and the center of the cam member 70 being equal to 2*e which is in fact the extent at which the axis 37 is offset with respect to axis 38 and which also represents the stroke of tilt of the device (see FIG. 3A).

Figure 5B:
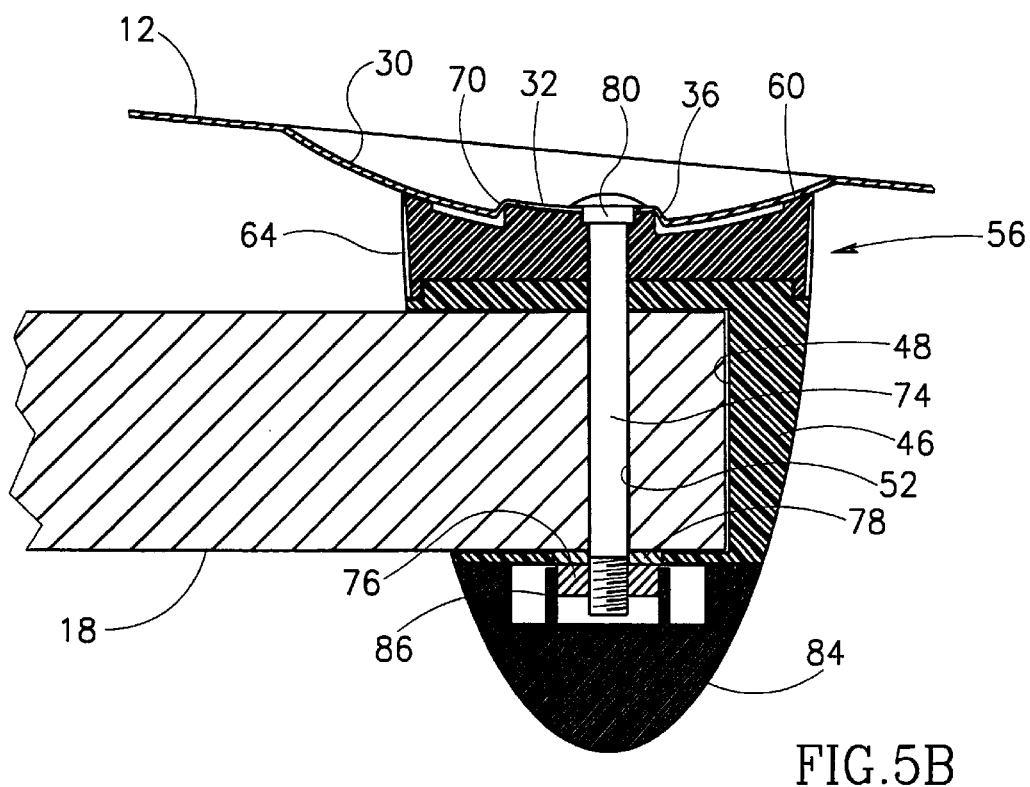

Upon rotating the manipulating member 56 in the direction of arrow 90 seen in FIG. 4A (or in the opposite direction), the cam member 70 slidingly displaces within the cam-engaging track 36, entailing tilting of tray 12 along the line of pitch, whereby shaft 74 displaces into a central position within the slit-like opening 32. In the position of FIGS. 4A and 4B the manipulating member 56 has been rotated by about 90° whereby tray 12 tilts forwardly at about 6°. Further rotation of the manipulating member 56 in the same direction displaces cam 70 within cam-engaging track 36 to a central position in which shaft 74 is positioned at a front-most end of slit-like opening 32 whereby tray 12 tilts forward at about 12° as seen in FIG. 5B.

Further rotation of the manipulating member 56 in either direction, i.e. in the direction of arrow 90 or oppositely, entails displacement of the tray 12 back into its initial, essentially horizontal position as seen in FIG. 4, through the intermediate position seen in FIGS. 4A and 4B. Obviously, tray 12 may be tilted to any intermediate position, depending on the rotational displacement of the manipulating member 56.

The arrangement is such that rotating tray 12 about the shaft 74 entails simultaneous, corresponding rotation of manipulating member 56 in order to ensure that the angle of tilt of tray 12 does not change upon rotation thereof. This may be ensured, for example, by increasing the rotational friction between the bottom surface of the spherical portion 30 and the seat portion 60 of the manipulating member 56, as compared with the rotational friction of the bottom surface of manipulating member 56 with the top surface of the seating member 46. This may be carried out, for example, by reducing the area of contact between the seating member 46 and manipulating member 56 or by increasing friction between the seat portion 60 of manipulating member 56 with the bottom surface of the spherical portion 30, e.g. by roughening the engaging surfaces.

The arrangement also ensures that rotational displacement imparted to the manipulating member 56 is translated to tilting displacement of the tray 12, however, vise-versa translation of displacement is not possible.

From the above description it is noted that tray 12 is tiltable about a tilt axis extending transversally along the line of pitch, the latter defined along the slit-like opening 32, between a first position in which the tray 12 is essentially horizontal and a second position in which it tilts forward, i.e. in a direction facing the viewer of a television set mounted on the tray, and where the tray is rotatable along the vertical axis of rotation extending through shaft 74.

Typically, the tray is tiltable between about 0°–20°, with a range of 0°–12° being preferable. However, it will be appreciated by a skilled person that the tray 12 may be tilted also backwards. This is carried out by forming the axis 37 of the cam-engaging track 36 aligned with the axis 38 of the spherical portion 30, whereby the tray may then be tilted either forward or backward along the line of pitch. Obviously, positioning the cam-engaging track offset at an opposite side of the center of the spherical portion would entail tilting the tray between its horizontal position and a rear tilt, along the same line of pitch.

By a preferred application of the system in accordance with the present invention, the peripheral surface 64 of the manipulating member 56 or the face of the seating member 46 may be provided with indicating means for indicating rotational displacement of the manipulating member 56 with respect to the seating member 46.

I claim:

1. A support tray assembly (10) for articulating to a supporting wall via a support arm (20), the support tray assembly (10) characterized in that it comprises:

a substantially planar tray (12) formed with a spherical portion (30), said spherical portion (30) being formed with a central slit-like opening (32) extending along a line of pitch of said tray (12); said tray being further formed with a cam-engaging track (36) extending along a tilt axis;

a manipulating member (56) formed with a seat portion (60) forming part of a sphere corresponding in shape with the spherical portion (30) of the support tray (12) and being in sliding engagement therewith; the manipulating member (56) is rotatable about an axis of rotation and is fitted with a cam member (70) rotatably fixed thereto; said cam member (70) is eccentric with respect to the axis of rotation and is adapted for reciprocal sliding engagement with the cam-engaging track (36) of the tray, along said tilt axis;

the support arm (20) is hinged at one end thereof to the supporting wall and at an opposed end thereof rotatably supports the manipulating member (56);

the arrangement being such that rotation of the manipulating member (56) imparts the tray (12) with reciprocal displacement only along the line of pitch.

2. A support tray assembly according to claim 1, wherein the tilt axis extends substantially transverse with respect to the slit-like opening (32).

3. A support tray assembly according to claim 2, wherein the tilt axis is offset with respect to an apex of the spherical portion along the line of pitch (37).

4. A support tray assembly according to claim 1, wherein axis of rotation is substantially vertical.

5. A support tray assembly according to claim 1, wherein the support tray (12) is slidingly attached to the manipulating member (56) by a shaft (74) slidingly received within the slit-like opening (32) of the support tray (12) and extending through a bore (52) within the manipulating member, along the axis of rotation.

6. A support tray assembly according to claim 5, wherein the support tray (12) and the manipulating member (56) are secured to the support arm (20) by the shaft (74) fastened to the support arm (20).

7. A support tray assembly according to claim 1, wherein the manipulating member (56) is formed with a gripping surface (64) to facilitate its grip by a user.

8. A support tray assembly according to claim 1 wherein the tray (12) is capable of being tilted along the line of pitch, between a first position in which it is essentially horizontal and where the cam member (70) is centrally positioned with respect to the cam-engaging track (36), and a second position in which the tray (12) is inclined to its maximal extent, where said cam member (70) is rotated by 180° with respect to the first position.

9. A support tray assembly according to claim 5, wherein the tray (12) is tiltable along the line of pitch (37), between a first position in which it is essentially horizontal and where the shaft (74) is situated at one end of the slit-like opening (32) of the tray, and a second position in which the tray (12) is inclined to its maximal extent, where the shaft is situated at an opposed end of the slit-like opening (32).

10. A support tray assembly according to claim 1, wherein the tray (12) is tiltable between about 0° and 20°.

11. A support tray assembly according to claim 1, wherein rotating the tray entails rotation of the manipulating member (56).

* * * * *